US006995787B2

(12) United States Patent
Adams

(10) Patent No.: US 6,995,787 B2
(45) Date of Patent: Feb. 7, 2006

(54) SPORTS PROJECTILE AND CAMERA APPARATUS

(76) Inventor: Steven L. Adams, 18501 Booth Cir., Leander, TX (US) 78641

( * ) Notice: Subject to any disclaimer, the term of this patent is extended or adjusted under 35 U.S.C. 154(b) by 622 days.

(21) Appl. No.: 10/224,777

(22) Filed: Aug. 21, 2002

(65) Prior Publication Data
US 2004/0036770 A1 Feb. 26, 2004

(51) Int. Cl.
H04N 7/18 (2006.01)

(52) U.S. Cl. ...................................................... 348/157
(58) Field of Classification Search ................. 348/157, 348/144, 150, 151, 207.99, 373, 169; H04N 7/18
See application file for complete search history.

(56) References Cited

U.S. PATENT DOCUMENTS

| 2,891,439 | A | | 6/1959 | Lee |
| 3,289,557 | A | | 12/1966 | Garcia et al. |
| 3,721,410 | A | * | 3/1973 | Anspacher ................. 348/144 |
| 4,543,603 | A | * | 9/1985 | Laures ....................... 348/145 |
| 4,713,686 | A | * | 12/1987 | Ozaki et al. ............... 348/157 |
| 4,864,333 | A | | 9/1989 | Barber |
| 5,938,545 | A | | 8/1999 | Cooper et al. |
| 6,357,936 | B1 | | 3/2002 | Elberbaum |
| 6,526,956 | B1 | * | 3/2003 | Hankins ....................... 124/86 |
| 6,567,116 | B1 | * | 5/2003 | Aman et al. ................ 348/169 |
| 6,640,200 | B1 | * | 10/2003 | Baum ......................... 702/142 |
| 6,711,590 | B1 | * | 3/2004 | Lennon ....................... 707/200 |
| 6,821,211 | B2 | * | 11/2004 | Otten et al. ................. 473/219 |
| 6,833,849 | B1 | * | 12/2004 | Kurokawa et al. .......... 715/723 |

FOREIGN PATENT DOCUMENTS

GB 2283144 * 4/1995

* cited by examiner

Primary Examiner—Nhon Diep

(57) ABSTRACT

A sports projectile and camera apparatus includes a sports projectile which includes a sports projectile outside housing. A camera is housed inside the sports projectile outside housing. The camera includes a camera lens which faces outside the sports projectile outside housing. A transmitter is connected to the camera, for transmitting waves which include information relating to images picked up by the camera. A shock absorbent assembly is inside the sports projectile outside housing and surrounds the camera. A ground or base station receives the transmitted waves, and which includes a transmitted-wave receiver. An image capture and processing system is connected to the receiver for receiving and processing images, and a monitor displays images processed by the image capture and processing system. The sports projectile and camera apparatus of the invention transmits and records images that a sports projectile would see if the projectile had eyes.

9 Claims, 3 Drawing Sheets

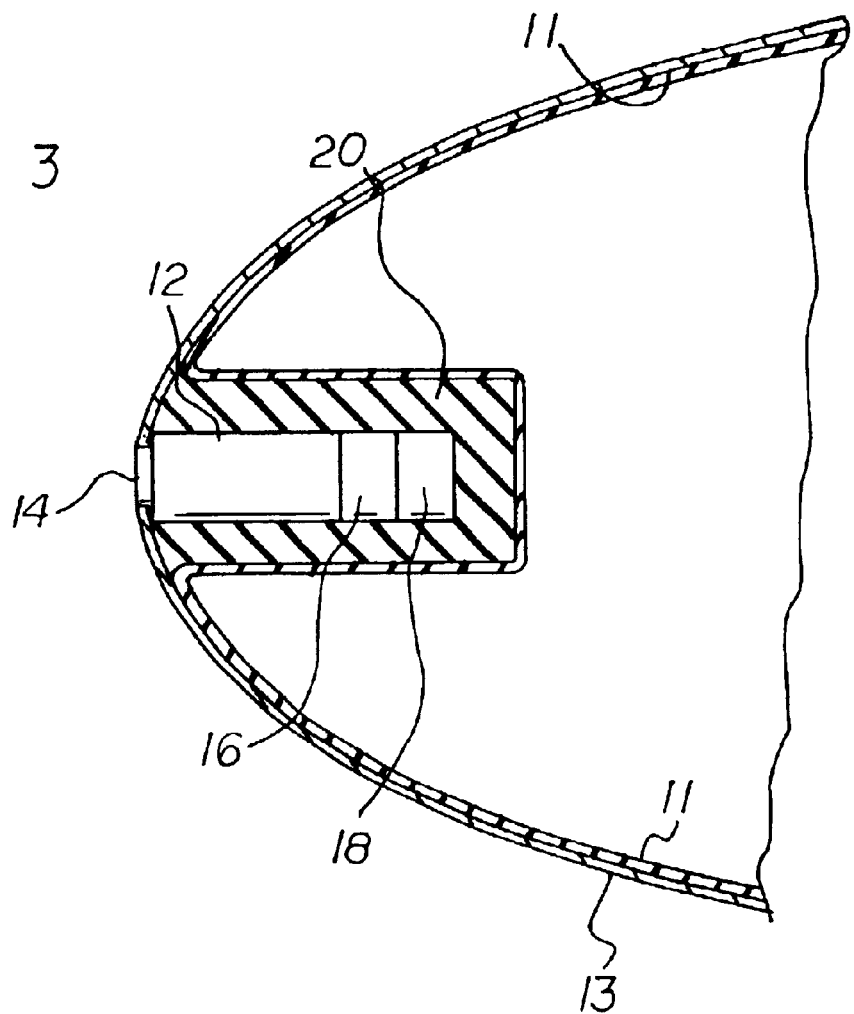
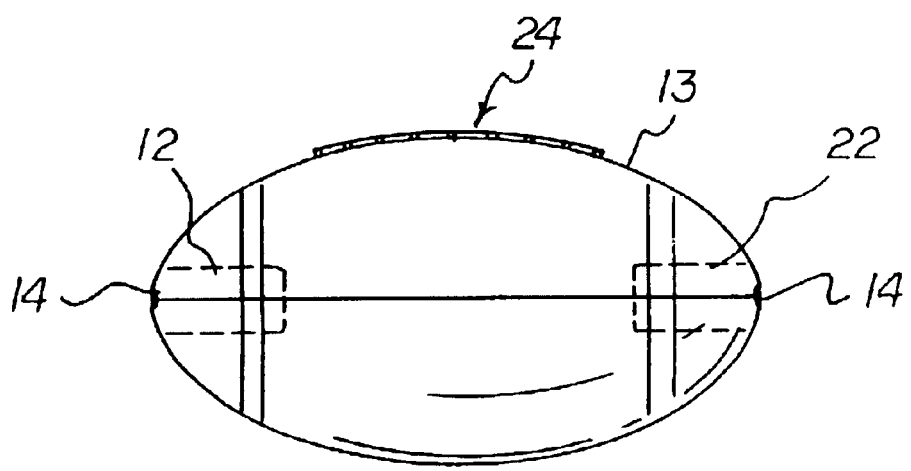

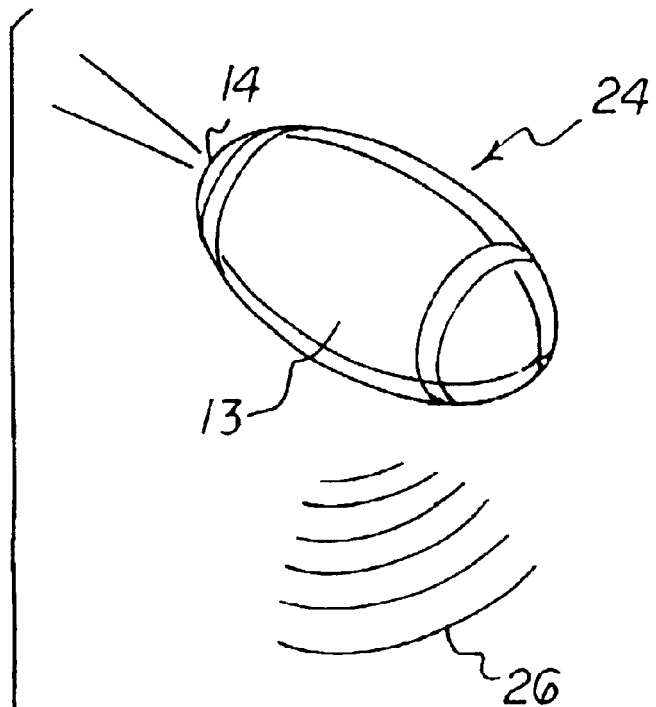
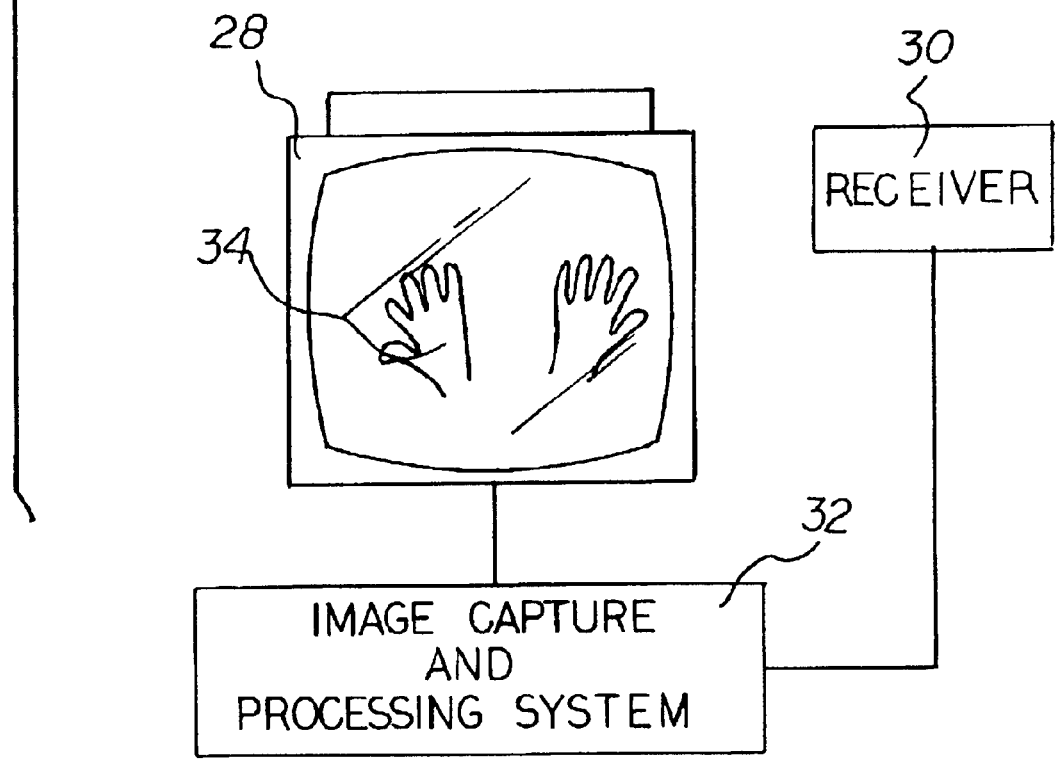
FIG 5

SPORTS PROJECTILE AND CAMERA APPARATUS

BACKGROUND OF THE INVENTION

1. Field of the Invention

The present invention relates generally to sports balls or other projectiles, and, more particularly, to devices especially adapted for recording the path of travel of a sports ball or other projectile.

2. Description of the Prior Art

When a sports ball is used, it often travels too fast for a person to carefully follow its path of travel. Yet an accurate following of its path of travel might be helpful to the person to improve one's performance. In this respect, it would be desirable if a device were provided which enabled an accurate following of the path of travel of a sports ball.

U.S. Pat. No. 5,938,545 discloses a video system for determining a location of a body in flight. The body in flight can be a golf ball. A pair of ground-based video cameras are employed, along with image capturing and image processing equipment. Although this system provides a number of useful features, this system does not provide and record images that would be seen by the body in flight if the body in flight included a video camera. In this respect, it would be desirable if a device were provided that provides and records images that would be seen by a body in flight if the body in flight included a video camera.

U.S. Pat. No. 2,891,439 discloses a camera system that is mounted in an airplane. An airplane is not a projectile in the sense that a sports ball is. An airplane is self-powered, whereas a sports ball is a projectile that provides none of its own power. In this respect, it would be desirable if a projectile, such as a sports ball, included its own on-board video camera. Moreover, U.S. Pat. No. 2,891,439 discloses a camera which records images on film which is on-board the airplane. For a sports ball that includes its own on-board video camera, it would not be necessary to include on-board film.

As a matter of interest, the following U.S. patents disclose cameras in a number of unusual settings, none of which include a sports ball: U.S. Pat. Nos. 3,289,557, 4,864,333, and 6,357,936.

For a camera that is on board a sports ball, some additional features would be desirable. For example, it would be desirable for an on-board camera system for a sports ball to include a transmitter for transmitting images to a ground station.

Sports balls are impacted in order to project them. Such impacts may cause damage to video camera system that is on-board the sports ball. In this respect, it would be desirable if a video camera system on-board a sports ball included shock protection.

For a sports ball that includes an on-board video camera system that transmits images to a ground station, it would be desirable if the ground station includes a receiver and image capturing and image processing equipment. In this respect, it would be desirable if images could be viewed on a monitor in real-time and can be captured and viewed and reviewed at a later time.

When a sports ball traverses a trajectory, it often spins. To help provide images that can be viewed without such spin, it would be desirable if a gyroscopic stabilizer system were provided for the sports ball. As an adjunct to a gyroscopic stabilizer system, or as an alternative to a gyroscopic stabilizer system, it would be desirable if the image capturing and image processing equipment in the ground station were provided with image processing features to correct for image spin.

A sports ball that is projected has both a projector and a target. In this respect, it would be desirable if a sports ball and camera apparatus provided a rear-facing camera that transmits images of the sports ball as is moves away from the projector and has a front-facing camera that transmits images of the sports ball as it moves towards the target.

Stated somewhat differently, it would be desirable if a sports projectile and camera apparatus were provided that transmits and records images that the ball would see if the ball had eyes.

Thus, while the foregoing body of prior art indicates it to be well known to use to follow the trajectory of a projectile, the prior art described above does not teach or suggest a sports projectile and camera apparatus which has the following combination of desirable features: (1) enables an accurate following of the path of travel of a sports ball; (2) provides and records images that would be seen by a body in flight if the body in flight includes a video camera; (3) includes its own on-board video camera; (4) is not necessary to include on-board film; (5) includes a transmitter for transmitting images to a ground or base station; (6) includes shock protection; (7) provides a ground or base station which includes a receiver and image capturing and image processing equipment; (8) provides images which can be viewed on a monitor in real-time and can be captured and viewed and reviewed at a later time; (9) can have a gyroscopic stabilizer system; (10) can be provided with image processing features to correct for image spin; (11) can provide a rear-facing camera that transmits images of the sports ball as is moves away from the projector and can provide a front-facing camera that transmits images of the sports ball as it moves towards a target; and (12) transmits and records images that the ball would see if the ball had eyes. The foregoing desired characteristics are provided by the unique sports projectile and camera apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a sports projectile and camera apparatus which includes a sports projectile which includes a sports projectile outside housing. A camera is housed inside the sports projectile outside housing. The camera includes a camera lens which faces outside the sports projectile outside housing. A transmitter is connected to the camera, for transmitting waves which include information relating to images picked up by the camera. A shock absorbent assembly is inside the sports projectile outside housing and surrounds the camera. A ground or base station is provided which receives the transmitted waves, and which includes a transmitted-wave receiver. An image capture and processing system is connected to the receiver for receiving and processing images, and a monitor is connected to the image capture and processing system for displaying images processed by the image capture and processing system.

A cover is provided for covering the sports projectile outside housing. The cover simulates a selected sports projectile outside surface.

The transmitter can transmit radio waves, and the receiver can receive radio waves. The shock absorbent assembly can include a quantity of shock absorbent material. A self-contained power supply (e.g. storage battery) can be provided for powering the camera and the transmitter.

Most commonly, the sports projectile outside housing is in a form of a sports ball. Preferably, the camera is a video camera. The video camera can be a front-facing camera and/or a rear-facing camera. The sports projectile and camera apparatus of the invention transmits and records images that a sports projectile would see if the projectile had eyes.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved sports projectile and camera apparatus which has all of the advantages of the prior art and none of the disadvantages.

It is another object of the present invention to provide a new and improved sports projectile and camera apparatus which may be easily and efficiently manufactured and marketed.

It is a further object of the present invention to provide a new and improved sports projectile and camera apparatus which is of durable and reliable construction.

An even further object of the present invention is to provide a new and improved sports projectile and camera apparatus which is susceptible of a low cost of manufacture with regard to both materials and labor, and which accordingly is then susceptible of low prices of sale to the consuming public, thereby making such sports projectile and camera apparatus available to the buying public.

Still yet a further object of the present invention is to provide a new and improved sports projectile and camera apparatus which enables an accurate following of the path of travel of a sports ball.

Still another object of the present invention is to provide a new and improved sports projectile and camera apparatus that provides and records images that would be seen by a body in flight if the body in flight includes a video camera.

Yet another object of the present invention is to provide a new and improved sports projectile and camera apparatus which includes its own on-board video camera.

Even another object of the present invention is to provide a new and improved sports projectile and camera apparatus that is not necessary to include on-board film.

Still a further object of the present invention is to provide a new and improved sports projectile and camera apparatus which includes a transmitter for transmitting images to a ground or base station.

Yet another object of the present invention is to provide a new and improved sports projectile and camera apparatus that includes shock protection.

Still another object of the present invention is to provide a new and improved sports projectile and camera apparatus which provides a ground or base station which includes a receiver and image capturing and image processing equipment.

Yet another object of the present invention is to provide a new and improved sports projectile and camera apparatus that provides images which can be viewed on a monitor in real-time and can be captured and viewed and reviewed at a later time.

Still a further object of the present invention is to provide a new and improved sports projectile and camera apparatus that can have a gyroscopic stabilizer system.

Yet another object of the present invention is to provide a new and improved sports projectile and camera apparatus which can be provided with image processing features to correct for image spin.

Still a further object of the present invention is to provide a new and improved sports projectile and camera apparatus that can provide a rear-facing camera that transmits images of the sports ball as is moves away from the projector and can provide a front-facing camera that transmits images of the sports ball as it moves towards a target.

Yet another object of the present invention is to provide a new and improved sports projectile and camera apparatus which transmits and records images that the ball would see if the ball had eyes.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is an enlarged partial cross-sectional view of the embodiment of the sports projectile of FIG. 2 taken along line 3—3 thereof.

FIG. 4 is a side view of a second embodiment of a sports projectile of the invention which includes both a front-facing camera and a rear-racing camera.

FIG. 5 is a partial exploded view of a sports projectile, in the form of a football, transmitting images which are displayed on a monitor at a ground or base station, wherein the transmitted and displayed image is that of the hands of a football player receiver who is getting ready to catch the passed football.

DESCRIPTION OF THE PREFERRED EMBODIMENT

With reference to the drawings, a new and improved sports projectile and camera apparatus embodying the principles and concepts of the present invention will be described.

Figure 1:
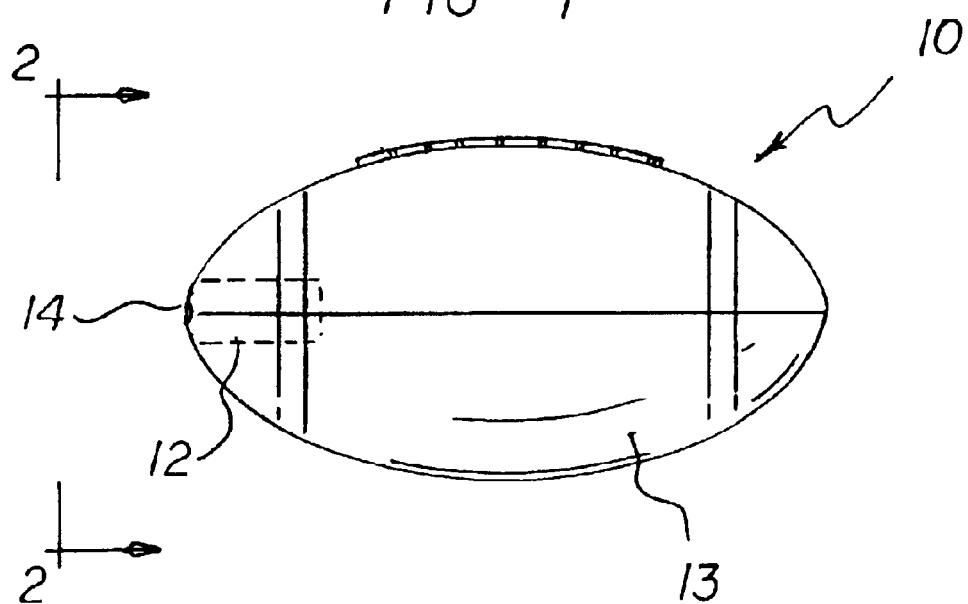
FIG. 1 is a side view showing a first embodiment of a sports projectile of a sports projectile and camera apparatus of the invention, wherein the sports projectile has a front-facing camera.
Figure 2:
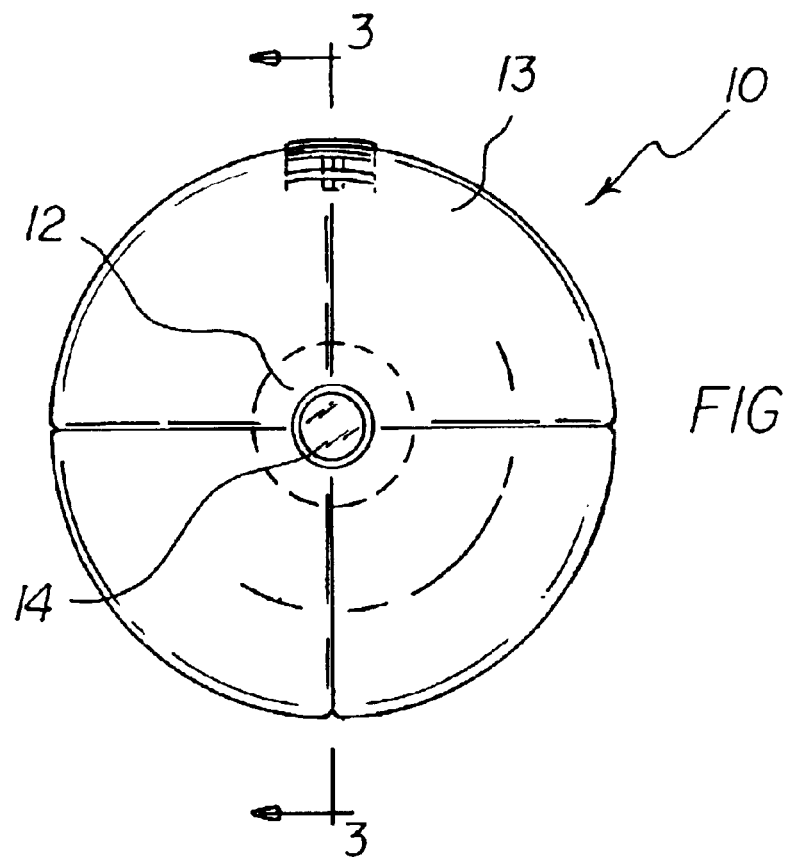
FIG. 2 is an enlarged front view of the embodiment of the sports projectile shown in FIG. 1 taken along line 2—2 of FIG. 1.

Turning to FIGS. 1–3, a first embodiment of the sports projectile and camera apparatus of the invention is shown. In this respect, the sports projectile and camera apparatus includes a sports projectile 10 which includes a sports projectile outside housing 11. A camera is housed inside the sports projectile outside housing 11. The camera includes a camera lens 14 which faces outside the sports projectile outside housing 11. A transmitter 18 is connected to the camera, for transmitting waves 26 which include information relating to images picked up by the camera. A shock absorbent assembly 20 is inside the sports projectile outside housing 11 and surrounds the camera. A ground or base station is provided which receives the transmitted waves 26, and which includes a transmitted-wave receiver 30. An image capture and processing system 32 is connected to the receiver 30 for receiving and processing images, and a monitor 28 is connected to the image capture and processing system 32 for displaying images processed by the image capture and processing system 32.

A cover 13 is provided for covering the sports projectile outside housing 11. The cover 13 simulates a selected sports projectile outside surface. For example, in the drawings, the cover 13 simulates a football.

The transmitter 18 can transmit radio waves, and the receiver 30 can receive radio waves. The shock absorbent assembly 20 can include a quantity of shock absorbent material.

A power supply 16 can be provided for powering the camera and the transmitter 18.

Most commonly, the sports projectile outside housing 11 is in a form of a sports ball. The sports projectile outside housing 11 can be in the form of the following sports balls, but not limited to: football, golf ball, basketball, baseball, soccer ball, tennis ball, and bowling ball. The sports projectile outside housing 11 can also be in the form of a hockey puck and other non-ball sports projectiles.

The camera can be a still camera. Alternatively and preferably, the camera can be a video camera. Preferably, the video camera is a front-facing camera 12.

Turning to FIGS. 4 and 5, a second embodiment of the invention is shown. Reference numerals are shown that correspond to like reference numerals that designate like elements shown in the other figures. In addition, a rear-facing camera 22 is also provided in conjunction with the front-facing camera 12.

To use the embodiments of the invention shown in the drawings, initially the front-facing camera 12 is turned on, and the transmitter 18 transmits waves 26 which carry images seen by the camera 12. At the ground or base station, the receiver 30, the image capture and processing system 32, and the monitor 28 are turned on so that images from the camera 12 can be captured, processed, and displayed. The image capture and processing system 32 can employ a programmable computer, and software can be employed that can processes images to eliminate some frames and stitch together other frames to create a smooth monitor image.

When the sports projectile 10 is launched, a stream of images are transmitted to the ground or base station, and the stream of images are received and processed. As shown in FIG. 5, hands of a football player receiver 34 are displayed on the monitor 28 from the second embodiment 24 of the sports projectile which is in the form of a football.

If desired, the sports projectile can contain a gyroscopic stabilizer system (not shown) which can reduce spinning of the sports projectile. Alternatively, the image capture and processing system 32 can includes software that corrects for spinning images.

The components of the sports projectile and camera apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved sports projectile and camera apparatus that is low in cost, relatively simple in design and operation, and which advantageously enables an accurate following of the path of travel of a sports ball. With the invention, a sports projectile and camera apparatus provides and records images that would be seen by a body in flight if the body in flight includes a video camera. With the invention, a sports projectile and camera apparatus is provided which includes its own on-board video camera. With the invention, a sports projectile and camera apparatus is provided which is not necessary to include on-board film. With the invention, a sports projectile and camera apparatus is provided which includes a transmitter for transmitting images to a ground or base station.

With the invention, a sports projectile and camera apparatus is provided which includes shock protection. With the invention, a sports projectile and camera apparatus provides a ground or base station which includes a receiver and image capturing and image processing equipment. With the invention, a sports projectile and camera apparatus provides images which can be viewed on a monitor in real-time and can be captured and viewed and reviewed at a later time. With the invention, a sports projectile and camera apparatus is provided which can have a gyroscopic stabilizer system. With the invention, a sports projectile and camera apparatus is provided which can be provided with image processing features to correct for image spin. With the invention, a sports projectile and camera apparatus is provided which can provide a rear-facing camera that transmits images of the sports ball as is moves away from the projector and can provide a front-facing camera that transmits images of the sports ball as it moves towards a target. With the invention, a sports projectile and camera apparatus provides transmission and recording of images that the ball would see if the ball had eyes.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A sports projectile and camera apparatus, comprising:
   a sports projectile which includes a sports projectile outside housing,
   a camera inside said sports projectile outside housing, wherein said camera includes a camera lens which faces outside said sports projectile outside housing,
   a transmitter, connected to said camera, for transmitting waves,
   a shock absorbent assembly surrounding said camera, and
   a ground or base station, which receives said transmitted waves, and which includes a transmitted-wave receiver, an image capture and processing system connected to said receiver for receiving and processing images, and a monitor connected to said image capture and processing system for displaying images processed by said image capture and processing system.

2. The apparatus of claim 1, further including:
   a cover for covering said sports projectile outside housing.

3. The apparatus of claim 1 wherein:
   said transmitter transmits radio waves, and
   said receiver receives radio waves.

4. The apparatus of claim 1 wherein said shock absorbent assembly includes a quantity of shock absorbent material.

5. The apparatus of claim 1, further including:
   a power supply for powering said camera and said transmitter.

6. The apparatus of claim 1 wherein said sports projectile outside housing is in a form of a sports ball.

7. The apparatus of claim 1 wherein said camera is a video camera.

8. The apparatus of claim 7 wherein said video camera is a front-facing camera.

9. The apparatus of claim 8, further including a rear-facing camera.

* * * * *